March 7, 1939.  H. E. McLURE  2,150,074
TACKLE CONNECTOR
Filed Oct. 19, 1936
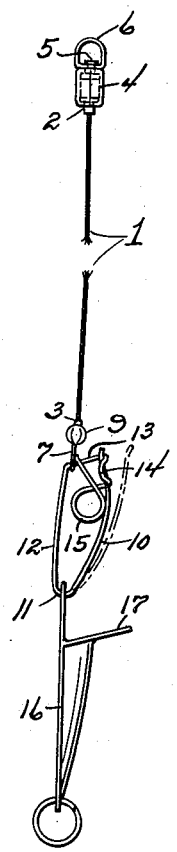
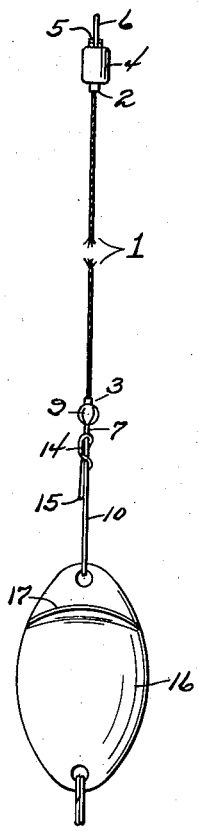
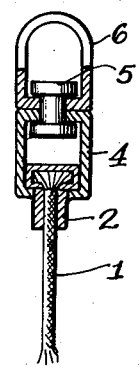
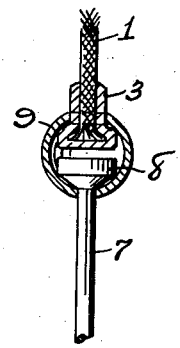
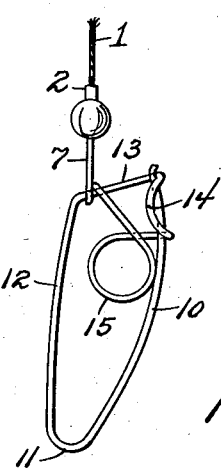
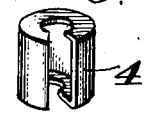
Howard E. McLure
INVENTOR
BY Victor J. Evans & Co.
ATTORNEYS Patented Mar. 7, 1939

2,150,074

UNITED STATES PATENT OFFICE 2,150,074

TACKLE CONNECTOR

Howard E. McLure, New Castle, Pa.

Application October 19, 1936, Serial No. 106,434

1 Claim. (Cl. 43—28)

This invention relates to tackle connectors, and its general object is to provide a connector that is primarily designed for use with fishing lines for attaching hooks, plugs, spinners, lures and the like thereto, and which combine the line receiving ring, swivels, leader and safety snap hook into a single unit, with the parts permanently secured together by the swivels at the ends of the leader, to assure independent free movement thereof, yet casual separation or displacement is practically impossible.

An important object of the invention is to provide a safety snap hook formed from a single strand of resilient wire and which is not only permanently and swivelly connected to the leader, but can be easily and expeditiously opened and closed, and when closed is held accordingly against any possibility of accidental opening.

A further object of the invention is to provide a connector of the character set forth, that is simple in construction, inexpensive to manufacture and extremely efficient in use, operation and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating my connector with a spinner attached to the safety hook thereof, and the latter disposed in closed position in full lines and open position in dotted lines.

Figure 2 is a view taken at right angles to Figure 1.

Figure 3 is an enlarged detail view of the safety snap hook of my tackle connector.

Figure 4 is a sectional view taken through the swivel means for the snap hook and illustrates the manner of attaching the shank thereof to the leader wire.

Figure 5 is a sectional view taken through the opposite swivel means and illustrates the manner of connecting the line receiving ring thereto.

Figure 6 is a detail view of one of the line receiving swivel members in closed position.

Figure 7 is a similar view of the member in open position.

Referring to the drawing in detail, the reference numeral 1 indicates a leader wire that has secured to the ends thereof caps 2 and 3, each of which include sleeve portions for the passage of the wire therethrough and enlarged hollow heads to receive the terminal ends of the wire, as best shown in Figures 4 and 5.

The cap 2 is swivelly mounted in the body of the swivel member 4 which as shown is of the barrel type, and includes a grooved pin 5 mounted in the body with one of the heads exteriorly thereof to receive a swivel ring 6, the latter being for the purpose of receiving the line for attaching the connector thereto, and the body is split longitudinally as best shown in Figures 6 and 7.

The safety hook of my connector is formed from a single strand of resilient wire and includes a shank 7 having a head 8 on its free end mounted within the body 9 of a globe type swivel, which likewise receives the cap 3, as best shown in Figure 4.

The structure of the safety hook in the form as shown is important, and the strand of wire from one end is bent in curved formation to provide what may be termed a latch arm 10, having an outwardly flared free end, while the opposite end merges into an abruptly curved end portion 11, thence the strand is directed in substantially parallelism with the arm 10, to provide an arm 12, thence the strand is directed at an upward inclination as at 13. From the inclined portion 13 the strand is further bent to provide a keeper 14 to receive the free end portion of the latch arm 10, and from the keeper the strand extends into a loop 15 arranged in the path of the arm 10 to contact the same to act as a locking means therefor for holding it in the keeper. However, it will be obvious that the locking loop 15 can be easily moved out of the path of the arm 10 when it is desired to remove the arm from the keeper. From the loop 15 the strand is directed upwardly and coiled about the upwardly inclined portion 13 adjacent its juncture with the arm 12, and thence is directed upwardly to provide the shank 7.

While I have illustrated a spinner 16 secured to the safety snap hook, it will be obvious that any other means may be secured thereto, such as hooks, plugs, lures and the like and the spinner as shown includes a weighted body having a wing 17 extending laterally from adjacent one end thereof and at a slight inclination, and preferably from the inner end of the weighted portion as shown, consequently it will be seen that the spinner will be caused to move laterally in an oscillatory manner, as it is being drawn through the water. The body of the spinner is of oval outline as shown and has openings in both ends thereof, with a ring received in the opening of the outer end for attaching hooks or the like thereto.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a tackle connector including a leader wire having swivels secured to the ends thereof, one swivel being for the connection of a line thereto, and a safety snap hook connected to the other swivel and formed from a single strand of resilient wire bent to provide a latch arm having an outwardly flared free end, an arm formed on the opposite end of the latch arm and extending substantially parallel therewith, an inclined portion formed on the second arm and directed toward the latch arm, keeper means formed on the inclined portion to receive the latch arm, locking means extending from the keeper means and arranged in the path of the latch arm for holding the latter within the keeper means, a shank extending from the locking means and connected to the inclined portion, and a head formed on the shank and mounted in the last mentioned swivel.

HOWARD E. McLURE.